US007961605B2

(12) United States Patent
Gusat et al.

(10) Patent No.: US 7,961,605 B2
(45) Date of Patent: Jun. 14, 2011

(54) SYSTEM AND METHOD FOR ENABLING MANAGEMENT OF A PLURALITY OF MESSAGES IN A COMMUNICATION NETWORK

(75) Inventors: Mircea Gusat, Langnau (CH); Wolfgang Emil Denzel, Langnau am Albis (CH); Antonius Paulus Engbersen, Feusisberg (CH)

(73) Assignee: International Business Machines Corporation, Armonk, NY (US)

( * ) Notice: Subject to any disclaimer, the term of this patent is extended or adjusted under 35 U.S.C. 154(b) by 1130 days.

(21) Appl. No.: 11/461,021

(22) Filed: Jul. 31, 2006

(65) Prior Publication Data

US 2008/0025217 A1 Jan. 31, 2008

(51) Int. Cl.
*H04L 12/26* (2006.01)
*H04L 12/28* (2006.01)
*G01R 31/08* (2006.01)
*H04B 7/005* (2006.01)
*H04B 1/44* (2006.01)
*G06F 15/173* (2006.01)
*G06F 15/16* (2006.01)

(52) U.S. Cl. ............... 370/229; 370/230.1; 370/232; 370/233; 370/234; 370/235; 370/278; 370/282; 709/224; 709/235

(58) Field of Classification Search .......... 370/234, 370/236, 391, 395.1, 412, 468, 278, 282, 370/288; 709/232, 234; 714/4
See application file for complete search history.

(56) References Cited

U.S. PATENT DOCUMENTS

| 5,594,729 A * | 1/1997 | Kanakia et al. ............ 370/391 |
| 5,633,859 A * | 5/1997 | Jain et al. ................. 370/234 |
| 5,717,875 A * | 2/1998 | Cutlerywala et al. ......... 710/315 |
| 5,754,530 A * | 5/1998 | Awdeh et al. .............. 370/236.1 |
| 5,781,532 A * | 7/1998 | Watt .............................. 370/236 |
| 5,805,577 A * | 9/1998 | Jain et al. ..................... 370/234 |
| 5,909,443 A * | 6/1999 | Fichou et al. ................. 370/412 |
| 5,935,213 A * | 8/1999 | Rananand et al. ........... 709/234 |
| 6,018,518 A * | 1/2000 | Smallwood et al. ......... 370/235 |
| 6,259,696 B1 * | 7/2001 | Yazaki et al. ............ 370/395.21 |
| 6,463,036 B2 * | 10/2002 | Nakamura et al. ......... 370/236.1 |
| 6,504,824 B1 * | 1/2003 | Tanaka et al. ................ 370/252 |
| 6,731,602 B1 * | 5/2004 | Watanabe et al. ............ 370/231 |
| 6,741,570 B1 * | 5/2004 | Kojima ......................... 370/253 |
| 6,757,885 B1 * | 6/2004 | Adusumalli et al. ........... 716/18 |
| 6,996,651 B2 * | 2/2006 | Garinger et al. ............. 710/305 |
| 7,296,083 B2 * | 11/2007 | Barham et al. ............... 709/232 |
| 7,366,818 B2 * | 4/2008 | Radulescu et al. ........... 710/316 |
| 7,372,814 B1 * | 5/2008 | Chiruvolu et al. ........... 370/235 |
| 2002/0089930 A1 * | 7/2002 | Aceves et al. ................. 370/230 |

(Continued)

*Primary Examiner* — Jayanti K Patel
*Assistant Examiner* — Christopher T Wyllie
(74) *Attorney, Agent, or Firm* — Stephen C. Kaufman; Eustus D. Nelson; Daryl K. Neff

(57) ABSTRACT

A method and system for enabling management of a plurality of messages in a communication network is provided. The method includes measuring an in-load and an out-service corresponding to a plurality of switching-nodes in the communication network. The method further includes marking at least one message in a switching-node with an Explicit Congestion Notification (ECN) to form at least one Precise ECN (PECN)-message, if at least one predefined criterion corresponding to a switching-node evaluates to true. Each PECN-message is encoded with measurements of the in-load and the out-service corresponding to the switching-node. Thereafter, one or more management functions are performed to modify egress of the plurality of messages from a source-node. The source-node transmits the plurality of messages to a destination-node through the switching-node.

16 Claims, 3 Drawing Sheets

U.S. PATENT DOCUMENTS

| | | | |
|---|---|---|---|
| 2002/0167901 A1* | 11/2002 | Brown et al. | 370/229 |
| 2003/0174651 A1* | 9/2003 | Morton | 370/235 |
| 2004/0042477 A1* | 3/2004 | Bitar et al. | 370/412 |
| 2004/0052212 A1* | 3/2004 | Baillargeon | 370/235 |
| 2004/0068640 A1* | 4/2004 | Jacobson et al. | 712/220 |
| 2004/0076118 A1* | 4/2004 | Ho et al. | 370/235 |
| 2005/0068987 A1* | 3/2005 | Schaik et al. | 370/503 |
| 2005/0122957 A1* | 6/2005 | Ambe | 370/351 |
| 2005/0251702 A1* | 11/2005 | Baccelli et al. | 714/4 |
| 2006/0015639 A1* | 1/2006 | Taylor | 709/235 |
| 2007/0081454 A1* | 4/2007 | Bergamasco et al. | 370/229 |
| 2007/0286070 A1* | 12/2007 | Schliwa-Bertling et al. | 370/229 |
| 2008/0025217 A1* | 1/2008 | Gusat et al. | 370/232 |
| 2008/0267070 A1* | 10/2008 | Mannal et al. | 370/235 |

* cited by examiner

SYSTEM AND METHOD FOR ENABLING MANAGEMENT OF A PLURALITY OF MESSAGES IN A COMMUNICATION NETWORK

FIELD OF THE INVENTION

The invention generally relates to a communication network. More specifically, the invention relates to managing a plurality of messages in the communication network.

BACKGROUND OF THE INVENTION

A communication network generally comprises a switching fabric. The switching fabric can route a message form its source-node to a destination-node that the message is destined for, by switching between a plurality of switching-nodes. The switching fabric can become overloaded due to various reasons, such as a heavy traffic of messages waiting to be switched, a non-operational link in the switching fabric or a slow rate of service for switching the messages. Explicit Congestion Notifications (ECNs) are used for signaling about an overload caused in one or more switching-nodes. In some communication networks, such as InfiniBand (IBA) communication networks, a switching-node can detect overload and can mark messages that lead to overload with an ECN. The messages are marked with an ECN by turning on one or more bits in header of the messages. The switching-node forwards the messages with an ECN bit in the header to one or more destination-nodes of the messages. An ECN destined for a destination-node is known as a Forward Explicit Congestion notification (FECN). After receiving the marked messages, the destination-nodes can send the ECNs obtained in the messages to the source-nodes. An ECN destined for a destination-node is known as a Backward Explicit Congestion Notification (BECN). The source-node reduces the injection rate of the messages in the switching-node based on a frequency of receiving BECN-messages. The injection rate is reduced until no BECN-messages are received or the injection rate of messages into the switching-node is low enough to avoid further overload of the switching-node.

In the above listed method, a switching-node is deemed overloaded only if the injection of the plurality of messages increases beyond a predefined threshold value. Further, to remove overloading a source-node alters the injection rate of messages based on the frequency of receiving BECN-messages. Additionally, the BECN-messages do not include information corresponding to severity of overload in the switching-node.

SUMMARY OF THE INVENTION

An object of the invention is to provide a method and system to enable the management of a plurality of messages in the communication network.

Another object of the invention is to provide a method and system for classifying and measuring the in-load and out-service of a plurality of switching-nodes.

Yet another object of the invention is to provide a method and system for encoding values corresponding to the in-load and the out-service in an ECN-message.

Another object of the invention is to provide a method and system to enable congestion management, load balancing, routing and Quality Of Service (QoS) in the communication network.

The above listed objectives are achieved by providing methods and systems for managing a plurality of messages in a communication network. The method includes measuring an in-load and an out-service corresponding to each switching-node in the communication network. An in-load of a switching-node corresponds to injection of a plurality of messages in one or more queues of the switching-node. An out-service of the switching-node corresponds to egress of messages from one or more queue of the switching-node. The method further includes, marking one or more messages in a switching-node with an Explicit Congestion Notification (ECN) to form one or more Precise ECN (PECN)-message, if one or more predefined criteria corresponding to a switching-node evaluates to true. One or more predefined criteria is evaluated based on measurement of the in-load and the out-service of the switching-node. Each PECN-message is encoded with information corresponding to the switching-node.

Thereafter, one or more management functions are performed to modify egress of the plurality of messages from a source-node. One or more management functions are performed based on the measurements of the in-load and the out-service encoded in each PECN-message. The source-node transmits the plurality of messages to a destination-node through the switching-node.

The system includes a load sensor module and a PECN-controller to achieve the above listed method steps.

BRIEF DESCRIPTION OF THE DRAWINGS

The foregoing objects and advantages of the invention for managing a plurality of messages in a communication network may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
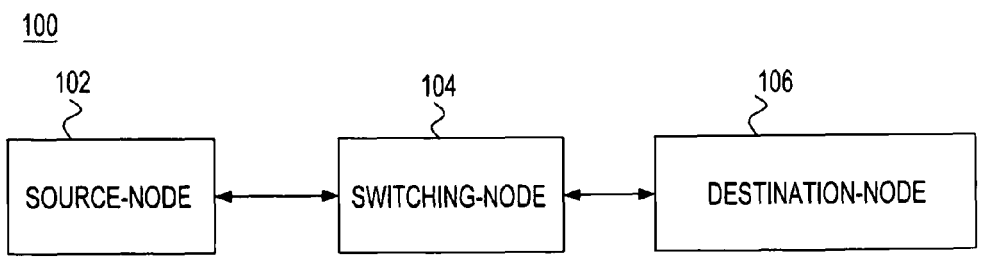
FIG. 1 is a block diagram showing an environment (that is exemplary) for the invention to function.

Before describing in detail embodiments that are in accordance with the invention, it should be observed that the embodiments reside primarily in combinations of method steps and system components related to systems and methods for enabling management of a plurality of messages in a communication network. Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art.

Various embodiments of the invention provide a method and a system for managing a plurality of messages in a communication network. The communication networks may be, for instance, an Interconnected Networks (ICTN) lossless networks or a lossy network. Examples of the ICTN lossless networks may include, but are not limited to PCI-Express Advance Switching (AS), Rapid Input/Output (I/O), Infiniband Architecture (IBA), Myrinet, Quadrics, and Data Center Ethernet (IEEE 802.1/3). Examples of the lossy networks may include, but are not limited to IP networks, wireless networks, and Ethernet. The plurality of messages are managed for congestion management, load balancing, routing and Quality Of Service (QoS) in the communication network.

FIG. 1 is a block diagram showing an environment 100 (that is exemplary) for the invention to function. Environment 100 may be an interconnect network. Environment 100 includes a source-node 102, a switching-node 104, and a destination-node 106. It will be apparent to a person skilled in the art that environment 100 may include a plurality of source-nodes, a plurality of switching-nodes, and a plurality of destination-nodes. Switching-node 104 switches a plurality of messages, which are destined for destination-node 106, from source-node 102 to destination-node 106. A message is switched based on information encoded in the header of the message.

Switching-node 104 includes one or more input-ports and one or more corresponding output-ports. Source-node 102 injects the plurality of messages in one or more input-ports of switching-node 104. Thereafter, switching-node 104 transmits the plurality of messages to destination-node 106 from an output-port of switching-node 104. The output-port is dedicated for destination-node 106. Switching-node 104 may include one or more queues to transmit one or more messages from an input-port to a corresponding out-port. Additionally, switching-node 104 may optically transmit one or more messages from an input-port to a corresponding output-port.

Figure 2:
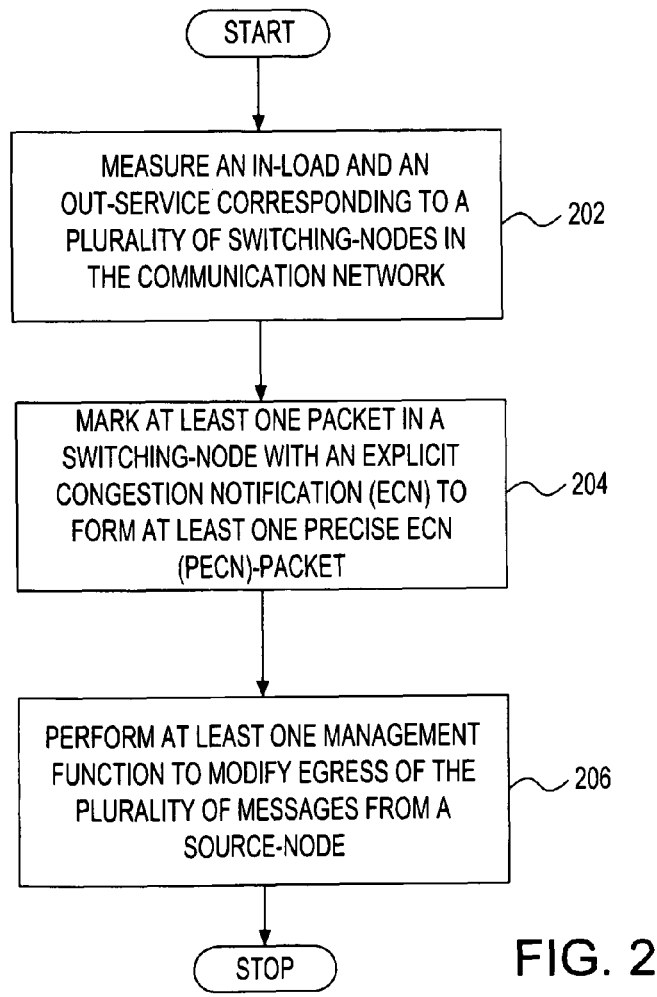
FIG. 2 is a flow diagram of a method for managing flow of a plurality of messages in a communication network, in accordance with an embodiment of the invention.

FIG. 2 is a flowchart of a method for enabling management of a plurality of messages in a communication network, in accordance with an embodiment of the invention.

At step 202, an in-load and an out-service corresponding to a plurality of switching-nodes in the communication network is measured. An in-load of switching-node 104 corresponds to injection of the plurality of messages in one or more input-ports of switching-node 104. Source-node 102 transmits the plurality of messages to destination-node 106 through switching-node 104. Source-node 102 injects the plurality of messages in one or more input-ports. An input-port corresponds to an output-port in switching-node 104. Therefore, switching-node 104 transmits the plurality of messages to destination-node 106 from one or more output-ports dedicated for destination-node 106. An out-service of switching-node 104 corresponds to egress of one or more messages from one or more output-ports of switching-node 104. For example, if ten messages are injected in switching-node 104 per second through an input-port, then the in-load of switching-node 104 is ten messages/sec. Further, if four messages are transmitted from an output-port of switching-node 104 to destination-node 106, then the out-service of the queue of switching-node 104 is four messages/sec. The output-port corresponds to the input-port and is dedicated to communicate with destination-node 106.

In an embodiment of the invention, the in-load and the out-service corresponding to switching-node 104 are measured periodically after a first predefined time-period. The first predefined time period is greater than Link-Level-Round Trip Time (LLRTT) and is less than End-to-End-RTT (EERTT). LLRTT of a link in the communication network is sum of the time utilized by one or more messages to reach a second switching-node from a first switching-node and the time utilized by one or more acknowledgements corresponding to one or more messages to reach the first switching-node from the second switching-node. The link enables communication between the first switching-node and the second switching-node. Further, EERTT in a communication network is sum of the time utilized by one or more messages to reach a destination-node from a source-node and the time utilized by one or more acknowledgements corresponding to one or more messages to reach the source-node in the communication network. A communication in the communication network is initiated at the source-node and terminated at the destination-node. The communication between the source-node and the destination-node is enabled by one or more switching-nodes. Therefore, EERTT includes one or more LLRTT.

Further, as the first predefined time period is greater than LLRTT and is less than EERTT, therefore, overreaction to the load conditions of the switching-node will not occur.

In another embodiment of the invention, the in-load and the out-service corresponding to switching-node 104 are measured, if switching-node 104 is deemed congested, so as to save power in the communication network. The in-load and the out-service corresponding to switching-node 104 may be measured in response to a request generated by one or more of source-node 102 and destination-node 106. The request is generated to determine the in-load and the out-service corresponding to switching-node 104.

After measuring the in-load and the out-service, one or more messages in switching-node 104 are marked with an Explicit Congestion Notification (ECN) at step 204, if one or more predefined criteria corresponding to switching-node 104 evaluate to true.

One or more predefined criteria are evaluated based on the measurement of the in-load and the out-service of switching-node 104. In an embodiment of the invention, a predefined criterion is the in-load of one or more input-ports exceeding a predefined in-load-threshold. Therefore, in this case, during measurement of the in-load and the out-service of switching-node 104, if the in-load of one or more input-ports exceeds the predefined in-load-threshold, then one or more messages are marked with ECN to form one or more Precise ECN (PECN)-messages. For example, the predefined in-load-threshold for an input-port is 10 messages/sec. Further, at the time when the in-load and out-service corresponding to a switching-node is measured, the in-load of one or more input-ports is 11 messages/sec. Therefore, one or more messages are marked with ECN to form one or more PECN-messages.

A predefined criterion may be the out-service of one or more output-ports descending below a predefined out-service-threshold. Therefore, in this case, during measurement of the in-load and the out-service of switching-node 104, if the out-service of one or more output-ports descends below the predefined out-service-threshold, then one or more messages are marked with ECN to form one or more PECN-messages.

One or more messages may be marked with ECN to form one or more PECN-messages, if the in-load of one or more input-ports exceeds the predefined out-service threshold of corresponding one or more output-ports during one or more first predefined time-periods. For example, during one or more first predefined time-periods, the predefined out-service threshold of an output-port is 10 messages/sec and the in-load of a corresponding input-port is 11 messages/sec. Therefore, switching-node 104 marks one or more messages with ECN to form one or more PECN-messages to convey that there is an excess input-load of 10 percent in switching-node 104. Additionally, the predefined out-service threshold of one or more output-ports may reduce temporarily to a reduced-out-service threshold. Therefore, in this case, if during one or more first predefined time-periods, the in-load of corresponding one or more input-ports is less than the predefined out-service threshold but greater than the reduced-out-service threshold, then one or more messages are marked with ECN to form one or more PECN-messages. For example, the predefined out-service threshold of an output-port is 10 messages/sec and the in-load of the corresponding input-port is 9 messages/sec. However, the predefined out-service threshold reduces temporarily to 8 messages/sec. Therefore, switching-node 104 marks one or more messages with ECN to form one or more PECN-messages.

Further, a predefined criterion may be a request being generated by one or more of source-node 102 and a destination-node 106 in the communication network to determine the measurement of the in-load and the out-service corresponding to switching-node 104. Therefore, one or more messages may be marked with ECN to form one or more PECN packets in response to the request generated by one or more of source-node 102 and destination-node 106. In an embodiment of the invention, the one or more messages are marked with ECN periodically after a second predefined time-period.

If the in-load of one or more input-ports in switching-node 104 exceeds a predefined in-load-threshold and/or the out-service of one or more output-ports in switching-node 104 descends below a predefined out-service-threshold, then switching-node 104 is deemed congested. However, switching-node 104 is uncongested, if the in-load of one or more input-ports in switching-node 104 is less than equal to out-service of one or more output-ports of switching-node 104.

One or more messages are marked with ECN to form one or more PECN-messages. Each PECN-message is encoded with measurements of the in-load and the out-service corresponding to switching-node 104. This information is used by one or more of source-node 102 and destination-node 106 to enable management of the plurality of messages in the communication network. In an embodiment of the invention, a PECN-message is an Absolute PECN (APECN)-message. An APECN-message is encoded with absolute value of each of an in-load and an out-service of switching-node 104. The in-load of switching-node 104 when normalized to LLRTT determines the minimum sampling rate of a feedback loop in the communication network. In an embodiment of the invention, the PECN-message may further include one or more of ID of a congested switching-node, congested port, congested Virtual Lane (VL), and a number of the congested queue in the congested switching-node. For example, switching-node 104 is congested and the in-load is 10 messages/sec and the out-service is four messages/sec. Therefore, switching-node 104 generates one or more APECN-messages. The header of each APECN-message includes the values ten (corresponding to the in-load) and four (corresponding to the out-service). Switching-node 104 encodes absolute values of in-load and out-service in a PECN-message, if switching-node 104 is not enabled to execute complex computations.

In an embodiment of the invention, a PECN-message is a Weighted-PECN (WPECN)-message. The WPECN-message is encoded with weighted-feedback-values corresponding to an in-load and an out-service of one or more queues of switching-node 104. The weighted-feedback-values include one or more of a Hot Spot Severity (HSV)-factor, a first derivative of the HSV-factor, and a second derivative of the HSV-factor. The weighted-feedback-values are computed in switching-node 104 before being conveyed to source-node 102. Switching-node 104 encodes weighted-feedback-values in a PECN-message, if switching-node 104 is enabled to execute complex computations. Additionally, as a WPECN-message includes weighted-feedback-values calculated in switching-node 104 corresponding to the in-load and the out-service, therefore, a WPECN-message reduces the bandwidth overhead consumed by an APECN, which includes an absolute value of an in-load and an absolute value of an out-service.

The HSV-factor corresponds to ratio of an in-load to an out-service of switching-node 104 corresponding to the PECN-message. In an embodiment, the ratio of the in-load to the out-service is normalized corresponding to maximum out-service rate of switching-node 104 to generate a normalized-HSV-factor. The normalized-HSV-factor is represented as, [(in-load−out-service)/predefined out-service threshold]. The normalized-HSV-factor is used to represent the speed with which the saturation-tree in the communication network grows. For example, in-load is 8, out-service is 4, and the predefined out-service threshold is 10. Therefore, the HSV-factor corresponds to the ratio of the in-load to the out-service, which is equal to 8/4, i.e., 2. Further, the normalized-HSV-factor is represented as, [|8−4|/10], i.e., 0.4.

In an exemplary embodiment of the invention, the HSV-factor is an integer value of one or more bits, which corresponds to the type of severity of congestion in switching-node 104. The type of severity of congestion may be categorized based on the HSV-factor using formulae represented as:

normal operation: <1.0;
incipient congestion: [1.0, 1+G(N/n)];
moderate congestion: [1+G(N/n), 1+H(N/n)];
severe congestion: [1+H(N/n), 1+I(N/n)];
extreme congestion: [1+I(N/n), 1+J(N/n)].

where,

N is in-load in switching-node 104;
n is out-service;
G, H, I, and J are predefined functions Further, the first derivative of the HSV-factor corresponds to the speed of increase of the HSV in switching-node 104. The second derivative of the HSV-factor corresponds to rate of alteration in speed of increase of the HSV of switching-node 104. One or more of the first derivative of the HSV-factor and the second derivative of the HSV-factor may be used to predict a lag in the feedback-loop in the communication network.

After marking one or more messages in switching-node 104 with ECN, one or more PECN-messages are transmitted to one of source-node 102 and destination-node 106. A PECN-message is one of a Backward Precise Explicit Congestion Notification (BPECN)-message and a Forward Explicit Precise Congestion Notification (FPECN)-message. An FPECN-message corresponds to a BPECN-message. This is further explained in detail in conjunction with FIG. 3. Source-node 102 receives one or more BPECN-messages and destination-node 106 receives one or more FPECN-messages. In an embodiment of the invention, switching-node 104 may not store information corresponding to one or more source-nodes and one or more destination-nodes to which PECN-messages have been transmitted. This enables switching-node 104 to achieve statelessness. In another embodiment of the invention, switching-node 104 stores information corresponding to one or more source-nodes and one or more destination-nodes to which PECN-messages have been transmitted. This may cause an overload on switching-node 104 for storing extra information.

Thereafter, at step 206, one or more management functions are performed to modify egress of the plurality of messages from source-node 102. One or more management functions are performed based on the measurement of the in-load and the out-service corresponding to switching-node 104 encoded in each PECN-message transmitted to one or more of source-node 102 and destination-node 106. One or more management functions are one of congestion management, load balancing, adaptive routing, and Quality Of Service (QOS) in the communication network. Based on the management function performed, source-node 102 regulates the egress of the plurality of messages. The egress of the plurality of messages is further modified based on the information encoded in one or more BPECN-messages. For example, if the switching-node 104 is congested and congestion management is the management function that is performed, then source-node 102 regulates the injection of the plurality of messages in switching-node 104, such that the congestion of switching-node 104 is relieved. Similarly, if load balancing is the management function performed, then source-node 102 regulates the egress of the plurality of messages, such that two switching-nodes communicating with source-node 102 have equal injection of messages.

Figure 3:
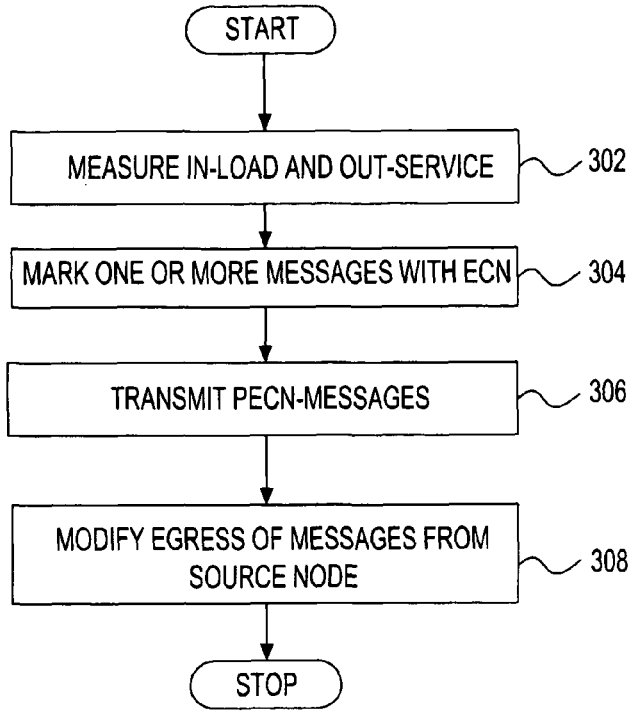
FIG. 3 is a flow diagram of a method for managing flow of a plurality of messages in a communication network, in accordance with another embodiment of the invention.

FIG. 3 is a flowchart of a method for enabling management of a plurality of messages in a communication network, in accordance with an embodiment of the invention. At step 302, an in-load and an out-service corresponding to a plurality of switching-nodes in the communication network is measured. This has been explained in conjunction with FIG. 2. After measuring the in-load and the out-service, one or more messages in switching-node 104 are marked with an ECN at step 304, if one or more predefined criteria corresponding to switching-node 104 evaluate to true. One or more predefined criteria have been explained in conjunction with FIG. 2. Thereafter, at step 306, one or more PECN-messages are transmitted to one of source-node 102 and destination-node 106. One or more PECN-messages may be transmitted in response to a request generated by one or more of source-node 102 and destination-node 106 in the communication network. In an embodiment of the invention, one or more PECN-messages are transmitted, if switching-node 104 is deemed as congested.

A PECN-message is one of a BPECN-message and an FPECN-message. An FPECN-message corresponds to a BPECN-message. In an embodiment of the invention, a BPECN-message may be sent directly to source-node 102 and an FPECN-message may be sent directly to destination-node 106. In this case, a new routing header is added in a PECN-message, which causes congestion. The routing header enables the PECN-message, which causes congestion, to reach source-node 102. The FPECN-message is a copy of the corresponding BPECN-message. In another embodiment of the invention, a FPECN bit in a header of a PECN-message that leads to congestion is set to on. The PECN-message with FPECN bit set to on is forwarded to destination-node 106. Thereafter, destination-node 106 changes FPECN-message into a BPECN-message and sends back to source-node 102. Destination-node 106 may send back the BPECN-message as an acknowledgement.

After source-node 102 receives at least one BPECN-message, one or more management functions are performed to modify egress of the plurality of messages from source-node 102, at step 308, to modify the egress of the plurality of messages from source-node 102. This has been explained in conjunction with FIG. 2.

Figure 4:
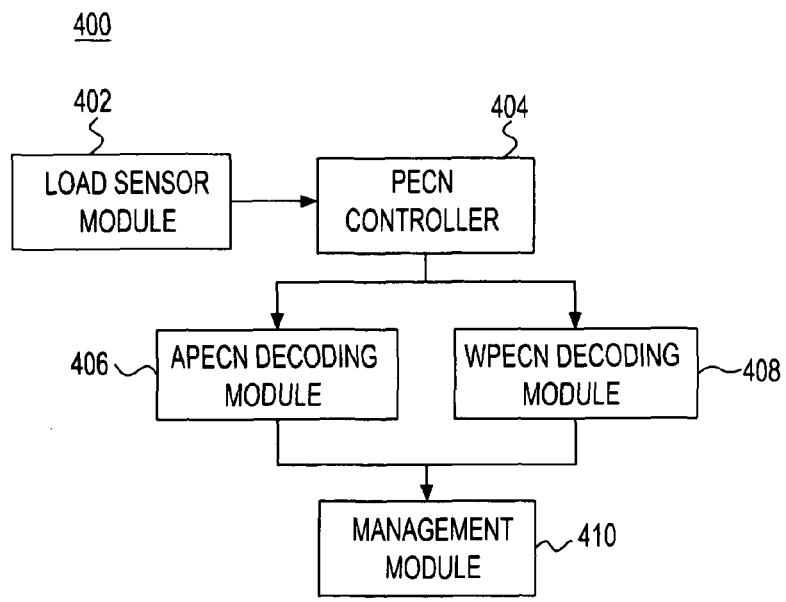
FIG. 4 is a block-diagram showing a system for providing a feedback-loop in a communication network.

FIG. 4 is a block-diagram showing a system 400 for providing a feedback-loop in a communication network, in accordance with an embodiment of the invention. System 400 includes a load sensor module 402 and a PECN-controller 404. Load senser module 402 measures an in-load and an out-service corresponding to the plurality switching-nodes in the communication network. An in-load of switching-node 104 corresponds to injection of the plurality of messages in one or more input-ports of switching-node 104. An out-service of switching-node 104 corresponds to egress of messages from one or more output-ports of switching-node 104. Load sensor module 402 is installed in switching-node 104. This has been explained in conjunction with FIG. 2.

Thereafter, PECN-controller 404 marks one or more messages in switching-node 104 with an ECN, if one or more predefined criteria corresponding to switching-node 104 evaluate to true. One or more messages are marked to form one or more PECN-messages. One or more predefined criteria are evaluated based on measurement of the in-load and the out-service of switching-node 104. Each PECN-message is encoded with measurements of the in-load and the out-service corresponding to switching-node 104. This has been explained in conjunction with FIG. 2. PECN-controller 404 encodes a PECN-message as one or more of an APECN-message and a WPECN-message. This is further explained in conjunction with FIG. 4.

After marking one or more messages in switching-node 104 with an ECN, PECN-controller 404 transmits one or more PECN-messages to one of source-node 102 and destination-node 106. A PECN-message is one of a BPECN-message and an FPECN-message. An FPECN-message corresponds to a BPECN-message. Source-node 102 receives one or more BPECN-messagea. Destination-node 106 receives one or more FPECN-messages. This has been explained in conjunction with FIG. 2.

Thereafter, if PECN-controller 404 encodes each PECN-message as APECN-message, then an APECN decoding module 406 in system 400 extracts the absolute values of the in-load and the out-service of switching-node 104 encoded in each APECN-message. Thereafter, based on the absolute values of the in-load and the out-service, PECN-controller 404 determines severity of load condition of the switching-node 104. APECN decoding module is installed in each of source-node 102 and destination-node 106, if they are enabled to execute complex computations. This has been explained in conjunction with FIG. 2. However, if PECN-controller 404 encodes each PECN-message as WPECN-message, then a WPECN decoding module 408 in system 400 extracts the weighted-feedback-values corresponding to the in-load and the out-service of switching-node 104 encoded in each WPECN-message. As the weighted-feedback-values represent the severity of load conditions, therefore WPECN decoding module 408 does not perform any complex computations. WPECN decoding module 408 is installed on each of source-node 102 and destination-node 106, if they are not enabled to execute complex computations.

Thereafter, management moduel 410 performs one or more management functions to modify egress of the plurality of messages from source-node 102. One or more management functions are performed based on the measurements of the in-load and the out-service encoded in each PECN-message. This has been explained in conjunction with FIG. 2.

Figure 5:
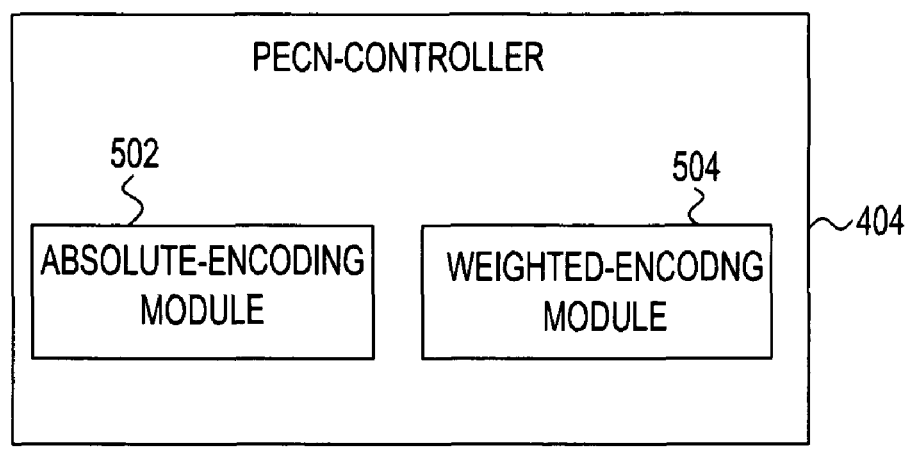
FIG. 5 is a block diagram showing modules of a PECN-controller, in accordance with an embodiment of the invention.

FIG. 5 is a block diagram showing modules of PECN-controller 404, in accordance with an embodiment of the invention. PECN-controller 404 includes an absolute-encoding module 502 and a weighted-encoding module 504. Absolute-encoding module 502 encodes one or more APECN-message. Each APECN-message is encoded with absolute value of each of an in-load and an out-service of switching-node 104. This has been explained in conjunction with FIG. 2.

Weighted-encoding module 504 encodes one or more WPECN-messages. Each WPECN-message is encoded with weighted-feedback-values corresponding to an in-load and an out-service of switching-node 104. This has been explained in conjunction with FIG. 2.

Various embodiments of the invention provide methods and systems to manage a plurality of messages in the communication network. The plurality of message are managed for congestion management, load balancing, routing and Quality Of Service (QoS) in the communication network. A source-node does not depend on the number of PECN-messages received to modify injection rate of messages in one or more queues of a switching-node. The injection rate of messages is modified based on information encoded in a PECR-message Further, various embodiments of the invention provide methods and systems in which a lag in a feedback-loop can be predicted using derivatives of HSV. Therefore, the feedback-loop can be stabilized based on the predicted lag in the feedback-loop. Additionally, error correction in the feedback-loop is corrected automatically.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of enabling management of a plurality of messages in a communication network, the method comprising:
    transmitting a plurality of messages from a source-node to a plurality of destination-nodes through a plurality of switching nodes of a communication network;
    measuring an in-load and an out-service corresponding to a plurality of switching-nodes in the communication network, wherein an in-load of a given one of the switching-nodes is a rate of injection of messages in at least one input-port of the given switching-node, an out-service of the given switching-node is a rate of egress of messages from at least one output-port of the given switching-node, wherein an input-port corresponds to an output-port;
    marking at least one message in the given switching-node with an Explicit Congestion Notification (ECN) to form at least one Precise ECN (PECN)-message, if at least one predefined criterion corresponding to the given switching-node evaluates to true, wherein each PECN-message is encoded with measurements of the in-load and the out-service corresponding to the given switching-node, wherein the at least one PECN-message includes an Absolute PECN (APECN)-message, and the APECN-message is encoded with absolute value of each of the in-load or the out-service of the given switching-node, wherein the switching-node generates the at least one PECN-message; and
    performing at least one management function to modify egress of the plurality of messages from the source-node, wherein the at least one management function is performed based on the measurements of the in-load and the out-service encoded in each PECN-message, the at least one PECN-message includes a Weighted-PECN (WPECN)-message, the WPECN-message is encoded with weighted-feedback-values corresponding to the measurements of the in-load and the out-service of the given switching-node, wherein the given switching-node generates the at least one PECN-message, wherein the weighted-feedback-values comprise at least one of:
    a Hot Spot Severity (HSV)-factor, wherein the HSV-factor corresponds to ratio of the in-load to the out-service of the given switching-node corresponding to the WPECN-message;
    a first derivative of the HSV-factor, wherein the first derivative of the HSV-factor corresponds to the speed of increase of the HSV of the given switching-node; and
    a second derivative of the HSV-factor, wherein the second derivative of the HSV-factor corresponds to rate of alteration in speed of increase of the HSV of the switching-node, wherein at least one of the first derivative of the HSV-factor and the second derivative of the HSV-factor predicts a lag in a feedback-loop in the communication network.

2. The method of claim 1, wherein the in-load and the out-service corresponding to the given switching-node is measured periodically after a first predefined time-period, the first predefined time period is greater than Link Level Round Trip Time (LLRTT) in the communication network, the first predefined time period is less than End-to-End Round Trip Time (EERTT) in the communication network.

3. The method of claim 1, wherein the in-load and the out-service corresponding to the given switching-node is measured in response to one of:
    the given switching-node being deemed congested; and
    a request being generated by at least one of the source-node and the destination-node in the communication network to determine the in-load and the out-service corresponding to the given switching-node.

4. The method of claim 1, wherein the at least one predefined criterion is at least one of:
    the in-load of at least one input-port in the given switching-node exceeding a predefined in-load-threshold;

the out-service of at least one output-port in the given switching-node descending below a predefined out-service-threshold;

the in-load of at least one input-port exceeding the predefined out-service-threshold of corresponding at least one output-port; and a request being generated by at least one of the plurality of source-nodes and the plurality of destination-nodes in the communication network to determine the measurement of the in-load and out-service corresponding to given switching-node.

5. The method of claim 4, wherein the at least one message in the given switching-node is marked with ECN periodically after a second predefined time-period.

6. The method of claim 4, wherein the given switching-node is considered congested, if at least one of:
the in-load of at least one input-port in the given switching-node exceeds a predefined in-load-threshold; and
the out-service of at least one output-port in the given switching-node descends below a predefined out-service-threshold.

7. The method of claim 4, wherein the given switching-node is uncongested, if the in-load of the at least one input-port in the switching-node is less than equal to out-service of the at least one output-port in the given switching-node.

8. The method of claim 1, wherein the weighted-feedback-values are computed in the given switching-node before being conveyed to the source-node.

9. The method of claim 1, further comprising transmitting the at least one PECN-message to one of the source-node and the destination-node, wherein the at least one PECN-message includes at least one of a Backward Precise Explicit Congestion Notification (BPECN)-message or a Forward Precise Explicit Congestion Notification (FPECN)-message.

10. The method of claim 9, wherein the at least one PECN-message is transmitted, if the given switching-node is deemed as congested.

11. The method of claim 9, wherein the at least one PECN-message includes the at least one BPECN-message and the at least one FPECN, the at least one BPECN-message being received by the source node and the least one FPECN-message being received by the destination-node.

12. The method of claim 11, wherein the source-node regulates the egress of the plurality of messages in response to performing the at least one management function, and the egress of the plurality of messages is regulated based on the information encoded in the at least one BPECN-message.

13. The method of claim 12, wherein the at least one management function is one of:
congestion management in the communication network;
load balancing in the communication network;
adaptive routing of the plurality of messages in the communication network; and Quality of Service (QOS) in the communication network.

14. The method of claim 11, wherein the at least one FPECN-message is a copy of the at least one BPECN-message.

15. A system for providing a feedback-loop in a communication network, the system comprising:
a plurality of switching nodes, each including:
a load sensor at a switching node, the load sensor being configured to measure an in-load and an out-service of the switching node, wherein an in-load is a rate of injection of messages in at least one input-port of the switching-node, an out-service is a rate of egress of messages from at least one output-port of the switching-node, and an input-port corresponds to an output-port;

a Precise Explicit Congestion Notification (PECN)-controller at the switching node, the PECN-controller being configured to:
mark at least one message in the switching-node with an Explicit Congestion Notification (ECN) to form at least one Precise ECN (PECN)-message, wherein the at least one PECN message include at least one of an Absolute Precise ECN (APECN) message or a Weighted Precise ECN (WPECN) message, if at least one predefined criterion corresponding to the switching-node evaluates to true, wherein each PECN-message is encoded with measurements of the in-load and the out-service corresponding to the switching-node; and transmit the at least one PECN-message to one of the source-node and the destination-node, wherein a PECN-message includes at least one of a Backward Precise Explicit Congestion Notification (BPECN)-message or a Forward Precise Explicit Congestion Notification (FPECN)-message, the system further comprising in at least the source-node or the destination-node:
an APECN decoding module, wherein the APECN decoding module is configured to extract absolute values of the in-load and the out-service corresponding to each of respective ones of the switching-nodes encoded in respective APECN-messages;

a WPECN decoding module, wherein the WPECN decoding module is configured to extract weighted-feedback-values of the in-load and the out-service corresponding to each of respective ones of the switching-nodes encoded in respective WPECN-messages; and a management module, wherein the management module is configured to perform at least one management function to modify egress of the plurality of messages from the source-node, wherein the at least one management function is performed based on the measurements of the in-load and the out-service encoded in each PECN-message.

16. The system of claim 15, wherein the PECN-controller comprises at least one of:
an Absolute-encoding module, the absolute-encoding module encodes at least one Absolute Precise ECN (APECN)-message, wherein each APECN-message is encoded with an absolute value of each of an in-load and an out-service of the given switching-node;

a weighted-encoding module, the weighted-encoding module encodes at least one Weighted Precise ECN (WPECN)-message, wherein each WPECN-message is encoded with weighted-feedback-values corresponding to an in-load and an out-service of the given switching-node.

* * * * *